United States Patent

[11] 3,523,515

[72] Inventor Clayton S. Brown
 8021 Juanita Drive, Kirkland, Washington 98033
[21] Appl. No. 764,567
[22] Filed Oct. 2, 1968
[45] Patented Aug. 11, 1970

[54] ABOVE SURFACE OBSERVED MARKER SECURED TO UNDERGROUND UTILITIES, ETC., TO INDICATE THEIR DEPTH AND DIRECTION
11 Claims, 10 Drawing Figs.
[52] U.S. Cl. ..................................... 116/114, 248/59
[51] Int. Cl. .................................... G01d 21/00
[50] Field of Search ......................... 116/114, 132, 118; 40/316, 21; 248/62, 59; 33/126.7, 169B

[56] References Cited
UNITED STATES PATENTS

| 1,086,442 | 2/1914 | Cornelius | 248/59 |
| 1,774,439 | 8/1930 | Holtson | 116/125 |
| 2,039,965 | 5/1936 | Lees et al | 33/126.7 |
| 2,339,992 | 1/1944 | Hohmeister | 248/62 |
| 2,939,419 | 6/1960 | Hawkins | 116/132XR |
| 3,049,326 | 8/1962 | Otterson | 248/59 |
| 3,166,041 | 1/1965 | Caggainello | 116/132XR |

*Primary Examiner*— Louis J. Capozi
*Attorney*— Roy E. Mattern, Jr.

ABSTRACT: A marker is secured to underground utilities and facilities and extended to and above ground and/or water level to indicate the depth and, when used with others, to indicate the direction of electrical cable, sewers, water mains, gas lines, etc. The marker has: a body capable of substantial upright positioning when finally installed generally upon back filling; an underground anchoring means on its lower body end to initially position and thereafter retain the marker end with underground utilities or facilities; a receiving means along portions of the body to receive optionally, temporary or permanent cross bracing and/or longitudinal ties to hold the marker body or marker bodies in place until back filling is undertaken; indicia means for indicating the depth dimension, what is buried, utilities or facilities, their types, sizes, flows, power capacities, direction, the installation dates, name, address, phone number of utility company and/or contractor; and/or optionally small deposits of active substances to be detected by equipment to be moved over the terrain, later on the above surface portions might possibly be removed, damaged, and/or covered.

Patented Aug. 11, 1970  3,523,515
Sheet 1 of 2
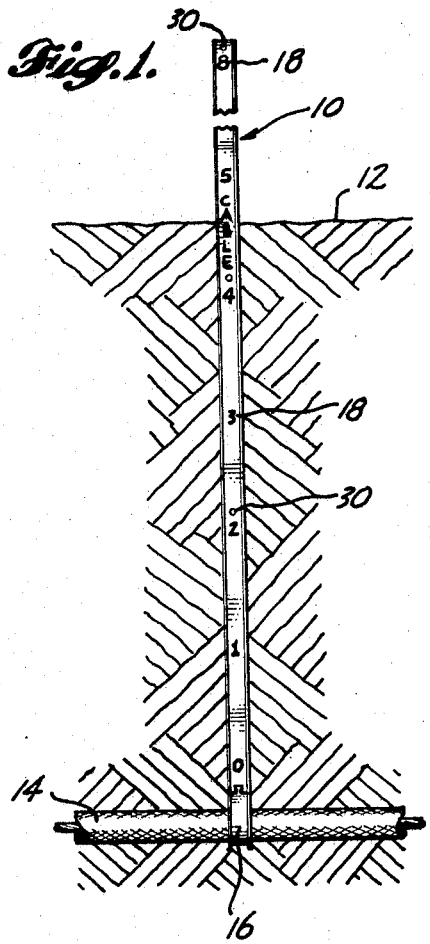
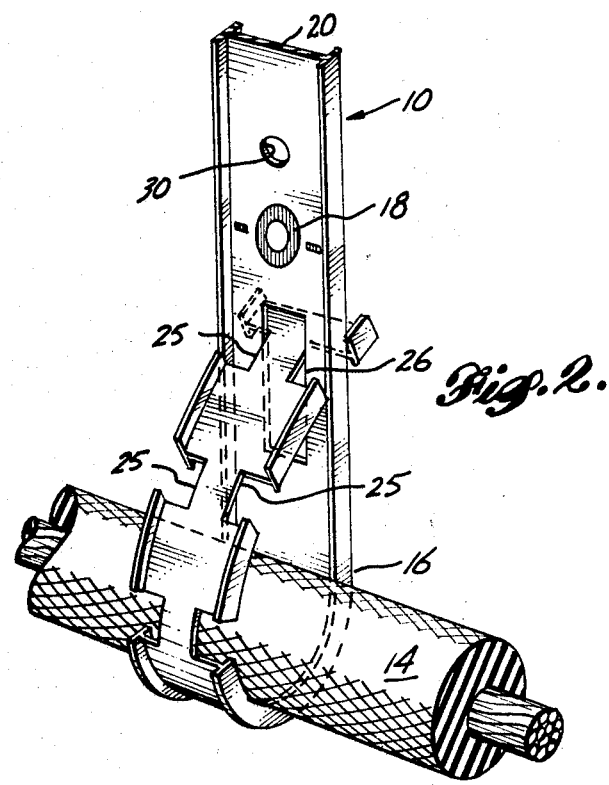
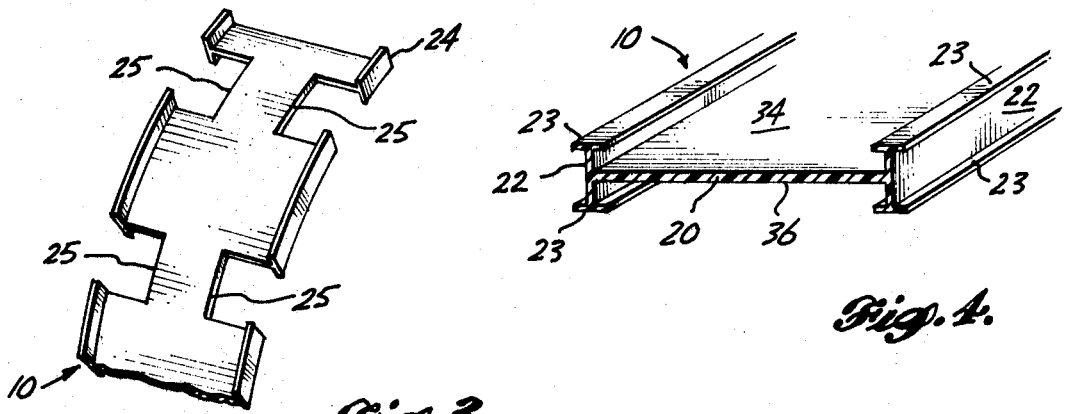
INVENTOR
CLAYTON S. BROWN
BY
Roy Mattern Jr.
ATTORNEY

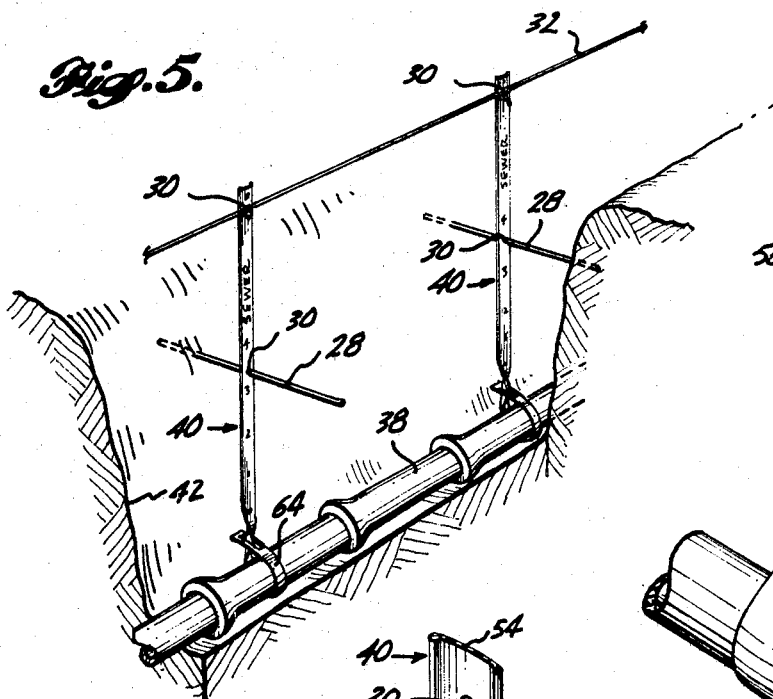
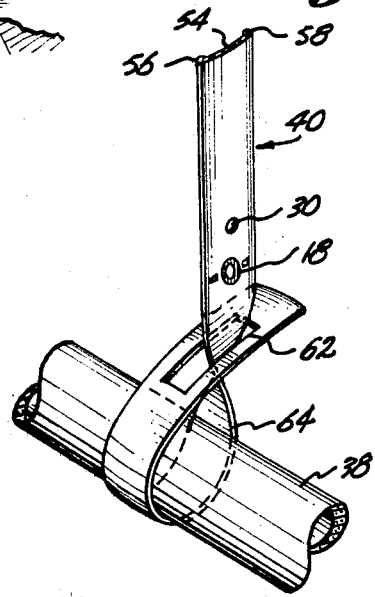
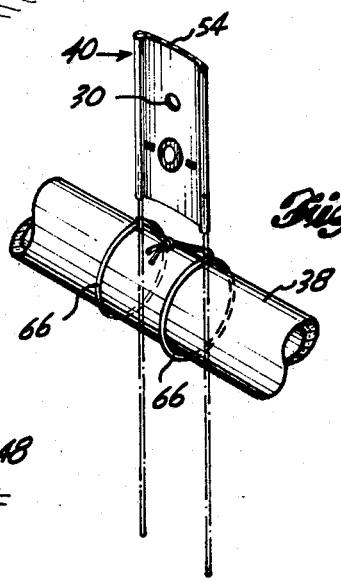
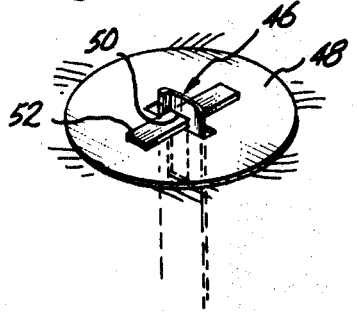
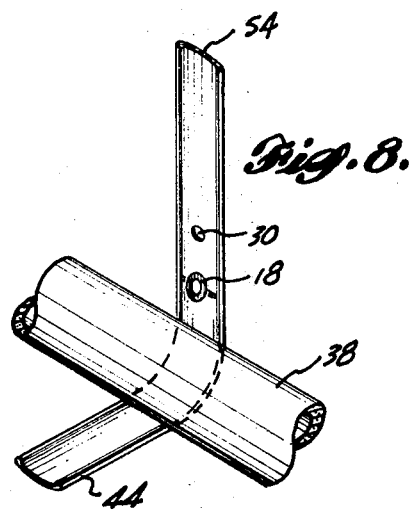
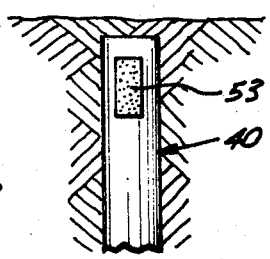

AN ABOVE SURFACE OBSERVED MARKER SECURED TO UNDERGROUND UTILITIES, ETC. TO INDICATE THEIR DEPTH AND DIRECTION

BACKGROUND OF THE INVENTION

During construction periods of residential buildings and commercial buildings, especially where many buildings are being erected nearby one another, earth diggings, soil movements, back filling, landscaping are all done in overlapping time schedules with various installations of underground facilities and utilities. Many men are working for different companies, contractors and sub-contractors and they are on and off the particular jobs at different times. As a result of these principal reasons, during construction and related times, installed utilities and facilities are very often inadvertently damaged and considerable costs are incurred in making repairs. Also a buried utility may have to be found: to avoid its damage; to make alterations to it; to record its position for permanent records of the owner, utility company and/or community; to avoid paving over it; etc.

Following completion of construction the potential of widespread damage by bulldozing, for example, is substantially eliminated. However, there always remains a need to know where utilities and other facilities may be located. Around a home, yard and garden lighting may be increased, a sewer may become clogged. Around an industrial building, additions may be undertaken, new electrical power is needed.

Both during construction and afterwards, records may be prepared. However, their adequacy, correctness and subsequent inconvenient referral may limit their usefulness.

Therefore, at all times there is a need for a quick and accurate way to determine right on a specific portion of land or over water where a specific utility or facility is located both with respect to its depth and direction. Prior to this time no means is ever believed to have been made available which fulfills all of these requirements resulting in substantial savings in material costs and service time whenever below surface locations of specific utilities and other facilities are wanted by persons or should be continuously made known to others.

SUMMARY OF THE INVENTION

For all subsequent time, below surface installations of utilities and other facilities are thoroughly identified by ground level or above indicia and/or other indicators presented on or integral with a marker extending up from its secured position below determined by such utility or facility. The marker is secured to the utility, such as an electrical cable before it is lowered into a trench, perhaps utilizing it during the lowering of the cable run, or it may be subsequently secured. Depending on the selected marker material and its configuration, the marker may or may not be supported in an upright position independently. If temporary preliminary support is needed, it is undertaken by hand or by adding cross and/or longitudinal ties and/or braces through holes in the marker before back filling and possibly thereafter. Following a construction phase of a development perhaps one year or less, inclusive of landscaping and landscaping, the marker may be cut off nearer surface elevation, perhaps being fitted to a surface plate.

Although many materials, sizes and contours may be used, those materials not subject to weather and earth deterioration are preferable such as plastics and/or plastic coated materials such as dipped wires or strips. Also the overall embodiment, although it should be capable of being placed substantially upright, its retreat is deemed desirable when hit by a person or vehicle, etc. without possibly causing injury to anyone and without its own complete destruction or dislodgement from its indicating position.

DRAWINGS OF PREFERRED EMBODIMENTS

Preferred embodiment of entire markers and portions of others are illustrated in the accompanying drawings; wherein:

FIGURE 1, is a side elevation view of an embodiment of the marker installed about an electrical cable, with back filled earth, for illustrative purposes, being sectioned;

FIGURE 2, is a perspective view of portions of an electrical cable around which, the lower end of the marker embodiment of FIGURE 1, has been secured using conveniently formed and fastened integral loop structures;

FIGURE 3, is a sample portion of the marker showing its I beam cross section, wherein the flanges are also further formed with I beam cross sections;

FIGURE 4, is a lower end portion of the marker indicating how notches are made for subsequent interfitting with a selected above located slot in the marker to complete a retaining loop as shown in FIGURE 2;

FIGURE 5, is a perspective view of an open trench, showing another embodiment of the marker installed about sewer pipes and supported by cross braces and longitudinal lines while awaiting back filling operations;

FIGURE 6 is a perspective view of portions of a sewer pipe around which the lower end of the marker, of embodiment of FIGURE 5, has been secured using conveniently formed and fastened integral loop structures;

FIGURE 7, is a perspective view of portions of a sewer pipe showing how structural wires of a marker of another embodiment, are used to tie its lower end to the pipe, the dotted lines indicating how the tie wires are originally extended in line with the body of the marker.

FIGURE 8 is a cross section view showing how a marker may be redirected at 90° under a conduit;

FIGURE 9 is a partial perspective view indicating how the marker may be identified in some areas, such as a playground, at ground level by a surface plate; and FIGURE 10, shows a portion of a marker on which a tape is secured to add identifying means.

DESCRIPTION OF PREFERRED EMBODIMENTS

All the embodiments illustrated in these figures and those discussed are directed to preserving knowledge, in a direct on the spot tangible form, concerning underground utilities and other facilities to save service costs and material costs. In order to accomplish such preservation, there is an initial added low cost to such underground installations based on cost of markers. Then there are limited additional costs incurred at the time of installation of an electrical cable 14 as illustrated in FIGURE 1, or of a sewer line 38 as illustrated in FIGURE 5. Markers 10 or markers 40 are preferably, quickly and easily secured about their respective cable 14 or sewer line sections 38 before the utilities are lowered into place in a trench 42. Where the utility 14 or 38 is continuous, like cable 14, markers 10 may be used to lower the utility into a trench 42. Once lowered, cross braces 28 are optionally passed through selected holes 30 in a marker 10 or marker 40 and extended between sides of a trench 42 to position, to prelocate and hold marker 10 or marker 40 until and during back filling. In addition to transverse cross braces 28, a rope or wire 32 is optionally used to tie markers 10 or markers 40 preferably at their in spaced intervals to prelocate and hold them until and during back filling.

After these steps involved in laying, marking and backfilling, the time commences wherein markers 10 or 40, or others, establish the potential of savings by avoiding causes of added costs such as: accidental re-digging into a utility which often seriously damages it; trying to relocate a utility to make changes; knowing where a utility is to avoid covering it with a hard top covering of a driveway or sidewalk when actually future accessibility is wanted; etc.

Throughout all installations of markers 10, 40 or others the basic requirements are similar. The marker is durable and not affected by water and/or soil conditions. Preferably, it has some inherent strength to keep itself positioned substantially vertical after backfilling to thereafter be a useful above surface indicator. Yet, if it is unintentionally struck by a landscraping machine, vehicle, etc. (not shown) it will bend over and there will be no damage or only minor damage involved. Moreover, any of these markers are quickly secured to the utility being placed underground. They are, preferably, secured permanently as shown in FIG. 1, 2, 5, 6, and 7 so no person standing on the surface may pull them out of the ground 12. If such removal capability were sought in limited areas, such as driveways, the installation of markers in such areas during the overall construction involves, optionally, the fold under securement 44, illustrated in FIG. 8. After final earth movements and before paving, markers so located by the ninety degree fold underlay, are retrieved for reuse.

However, even in most instances where near ground or just below ground retention of markers is wanted, they are unremovably secured at their bottom and subsequently removed in part where they extend above or are about to extend above the surface of earth 12. A preferred ground level upper end securing assembly 46 is illustrated in FIGURE 9. The cut down end of a particular marker 10 or 40 slightly protrudes above a plate or disc 48. Its protrusion is provided with a slot or hole 50, through which a traverse locking strip or bar 52 is inserted and optionally adhesively secured to disc 48. This termination is suitable for areas such as playgrounds, lawns, walkways, driveways, etc.

There are times, however, when after initial construction activities cease and there remains little likelihood of having a need to know where a utility has been placed underground, and its placement is in a locale where above surface or surface level indicators are not wanted, then below surface cut offs are undertaken. To insure, against high costs of finding such utility, the upward marker portion remains, even though unseen, to be easily found by taking a limited depth exploratory excavation. Moreover, by originally securing a small tape accessory 53, containing a detectable substance, preferably to the just below surface portions of the marker as shown in FIGURE 10, the markers 10 or 40 may be detected as a compatible sensing element (not shown) is carried by a person walking along the surface.

VARIOUS FORMS OF WEB SECTIONS OF MARKERS

In FIGURES 1,2,3, and 4, marker 10 has a cross section offering two flat web surfaces 34, 36, to receive printed on indicia or to receive taped on indicia. The indicia, preferably, identifies the type of utility, its size, the name of the utility company and/or contractor, and most importantly the depth at which the utility is located below the ground. Where several markers are not used to indicate the direction of the utility cable, pipe, or conduit, the direction is also recorded on the marker that is used. The disc or plate marker 48 of FIGURE 9, also receives indicia when it is used, with either marker 10 or 40.

However, in most instances, at least during construction periods, marker 10 extends above ground 12. Therefore to enhance its self supporting characteristics after back filling and yet permit it to bend under unintentional striking, its main web 20 terminates in flanges 22 forming an overall I cross section as illustrated in FIGURE 4. Preferably these principal flanges 22, themselves, are terminated in secondary flanges 23, forming auxiliary I cross sections along each edge of marker 10.

This self supporting characteristic in reference to marker 40 is obtained by utilizing an arcuate web cross section 54 as shown in FIGURES 5,6,7,8,9, and 10. The edge termini 56,58 of marker 40 are preferably rounded to increase the stiffness potential while still permitting bending under unintentional striking, perhaps by delivery trucks, etc.

Other web sections might be used, however, these illustrated embodiments are best suited for meeting the requirements of: having some self supporting characteristics; receiving readable indicia; interfitting with braces, guy lines, discs, and maintaining an anchor on underground utilities.

VARIOUS FORMS OF ANCHORING ENDS OF MARKERS

In FIGURES 1,2, and 3, marker 10 has a loop 16 which serves to secure or anchor its lower end to an underground utility, such as electrical cable 14. Loop 16 is formed on the construction site as lower T shaped tongue 24 is passed around the underground utility, then turned sideways, passed through slot 26, and thereafter turned back when opposite like side cut outs 25 are adjacent slot 26, thereby completing a secured loop anchored end of marker 10.

Where different cross sectional areas of utilities are anticipated and particular sized markers will not be available, additional sets of opposite like side cut outs 25 are provided. Such marker ends are then pulled through slot 26 until the correct fitting loop 16 is formed by using the most appropriate pair of like side cut outs 25.

In FIGURES 5 and 6, marker 40 is shown having an elongated slot 62 near its lower end which is wrapped around a utility, such as a sewer line 38. The top end is then pulled through slot 62 to complete anchoring loop 64.

In FIGURE 7, a marker, which could be of either embodiment 10 or 40, or a similar embodiment, is illustrated with a pair of extending wires 66 which are originally made as an extension of the marker. On the job site, paired wires 66 are passed a utility and thereafter wound around themselves to secure the entire marker to a cable 14, sewer line 38, etc.

In FIGURE 8, a marker, which could be of either embodiment 10 or 40, or similar embodiment, is illustrated with having an extending portion 44 which is bent and placed under a utility line. A strong pull could dislodge the marker. Therefore such markers would be used, where, after all construction, backfilling, and grading were completed, they were to be removed. Such a bent extension would also be used when the materials used in making the marker were not otherwise conveniently deformable in the ways illustrated in the other figures.

SUMMARY OF SUGGESTED MARKING USES

The marker in its various embodiments is used to indicate depth and/or direction, and/or to record data as to type, size, company name, contractor's name, government department name, address, phone numbers and/or any other pertinent data thought to be necessary to preserve knowledge on the spot and principally to avoid unintended destruction of portions of any utility or other facility, such as the following:

| | |
|---|---|
| Power lines | Gas pipes |
| Telephone lines | Oil pipes |
| Television lines | Slurry lines |
| Control wires | Tanks |
| Water pipes | Future service connections |
| Storm pipes | Anchors |
| Sewer pipes | Crab pots |
| Steam pipes | Nets |

In regard to those uses pertaining to water marker, the marker is equipped with a floatation component when it is not attached to a conventional float. The connection is undertaken as indicated in FIGURE 9 where a surface disc is used at ground level. For marine use disc or plate 48 is provided with a water tight chamber.

SPECIFICATIONS OF SELECTED SPECIFIC EMBODIMENTS

In reference to the embodiment shown in FIGURES 1 through 4, marker 10 is designed for placement about electrical cables. A non conductive flexible plastic material such as " P.V.C." meaning Polyvinyl Chloride, is directed through dies to form the I beam cross section. Preferably the material used allows the marker to be free standing two feet or more. It is 1" wide, 1/32" thick, and flanges are 3/16"90 in depth. A typical length is 8'. Yellow is the basic color and indicia is presented in dark blue. The lower slot used in forming the loop indicates zero feet and 3' below the top there is a six foot numeral. In reference to the embodiment of FIGURES 5 and 6, marker 40, the arcuate cross section is 15/16", 1/32 thick, having slightly enlarged rolled ends. Plastic material or a plastic coated material is used.

At all times in any embodiment care is taken to arrange loop or other anchoring structures so the selected zero marker remains at the top of the underground utility so the surface dimension is accurate in revealing the depth of the utility line.

I claim:

1. A marker device for a utility member comprising an elongated band-like marker body capable of substantial upright self-positioning, anchor means provided at one end of said marker body for attachment to a utility member to insure the unchanged location of the end of said marker body opposite said one end, indicia disposed along said marker body including linear foot designations commencing at said anchor means and extending along said marker body to the end of said body opposite said anchor means, said indicia presenting knowledge pertaining to the type of said utility member.

2. A marker device, as claimed in Claim 1, having receiving structure along the marker body to receive both temporary and permanent cross bracing and also to receive longitudinal ties, to hold the marker body until and during backfilling.

3. A marker device, as claimed in Claim 1, wherein said anchoring means is initially an extension of the marker body below its zero foot location and subsequently the extension is turned and placed under the utility.

4. A marker device, as claimed in Claim 1, wherein the portion of the marker body extending below its zero foot location passes closely around a utility returning to a holding means at its zero foot location completing the bottom anchoring means.

5. A marker device as claimed in Claim 1, wherein the marker body at its zero foot location has a receiving opening and then the body is extended under a utility and returned where it is provided with edge cut outs which interlock with edges of the receiving opening.

6. A marker device, as claimed in Claim 5, wherein the edge cut outs in the extended marker body are arranged in multiple pairs spaced apart for selected places of interlock depending on the cross sectional size of the utility that is surrounded in completing the bottom anchoring means.

7. A marker device, as claimed in Claim 1, wherein the bottom anchoring means, comprises a receiving opening at its zero foot location through which the other end of the marker, after being passed around a utility, is threaded through and pulled upwardly to form a bottom loop anchor below and then to extend upwardly above the surface as the marker.

8. A marker device, as claimed in Claim 1, wherein the bottom anchoring means, comprises, wires extending beyond the zero foot location, passed around a utility and then secured to themselves.

9. A marker device, as claimed in Claim 1, wherein the marker body at ground level is formed with a means to receive a surface member and such a surface member is secured to present indicia at ground level when a marker is restricted in its height above ground because of driveway access, etc.

10. A marker device, as claimed in Claim 1, wherein the marker body, between its zero foot level at the utility and ground level, is provided with a detectable indicating medium to be sensed by above surface searching units, to locate a marker still anchored to a utility but for some reason not extending above the resulting final ground level.

11. An above surface observed marker device secured to under surface utilities and other facilities to indicate their depth, ownership, type and direction, comprising:
  (a) a marker body capable of substantial upright self positioning when finally installed;
  (b) a bottom anchoring means on the marker body to initially position and thereafter retain its lower body end with an under surface utility member to insure the unchanging location of the above surface portions of the marker body in presenting on the spot knowledge pertaining to the under surface utility, such retention being assured as an extended portion of the marker body beyond its zero foot mark is closely passed around a utility member and then secured to the marker body at the zero foot mark;
  (c) receiving structures positioned on the marker body to receive both temporary and permanent cross bracing and also to receive longitudinal ties, to hold the marker body until and during backfilling over the utility; and
  (d) permanent indicia formed on the marker body presenting information for above surface observation setting forth pertinent data regarding the under surface utility member.